United States Patent
Darvasi

[11] 3,754,828
[45] Aug. 28, 1973

[54] BALANCED NEEDLE FOCUSING SYSTEM
[75] Inventor: John Darvasi, Des Plaines, Ill.
[73] Assignee: Bell & Howell Company, Chicago, Ill.
[22] Filed: May 4, 1972
[21] Appl. No.: 250,403

Related U.S. Application Data
[63] Continuation of Ser. No. 50,503, June 29, 1970, abandoned.

[52] U.S. Cl. .................... 356/8, 88/1.5 R, 95/11 V, 95/44 C
[51] Int. Cl. ...................... G03b 13/04, G03b 13/18
[58] Field of Search .................... 88/1.5 R; 356/142, 356/143, 8; 95/11 V, 44 C

[56] References Cited
UNITED STATES PATENTS

| | | | |
|---|---|---|---|
| 1,163,594 | 12/1915 | Fry | 356/8 |
| 811,777 | 2/1906 | Konig | 356/143 |
| 3,583,300 | 6/1971 | Johnson et al. | 88/1.5 R X |
| 873,904 | 12/1907 | Schneider | 356/143 |
| 901,888 | 10/1908 | Crim | 356/143 |
| 1,299,030 | 4/1919 | Reynolds | 356/8 |
| 1,568,759 | 1/1926 | Magin et al. | 356/8 |
| 2,238,032 | 4/1941 | Burka et al. | 356/143 |
| 3,094,911 | 6/1963 | Reiche et al. | 88/1.5 R UX |

Primary Examiner—Ronald L. Wibert
Assistant Examiner—F. L. Evans
Attorney—John E. Peele, Jr. et al.

[57] ABSTRACT

A distance determining mechanism usable with an optical instrument having a focusable objective and a viewfinder in which the distance determining mechanism yields a visual indication of instrument to subject distance, which indication is usable for adjusting the focus condition of the focusable objective to that distance while continuing to view the subject. Preferably, the distance determining mechanism within the viewfinder, includes a balanced indicator member orientable responsive to gravity and arranged to form a movable subject base reference and further arranged so that the indicator member is visible in the viewfinder during determination of distance and is substantially aligned with a vertical limit of the field of view of the viewfinder when substantially horizontally oriented.

6 Claims, 4 Drawing Figures

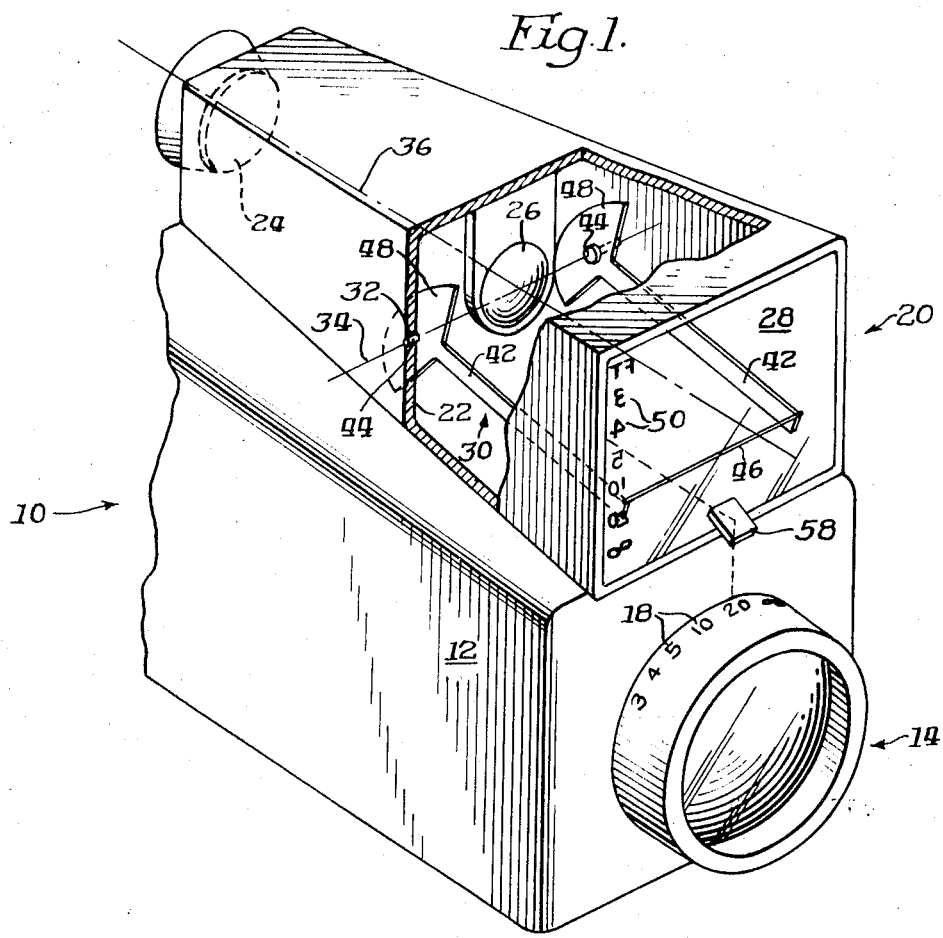

BALANCED NEEDLE FOCUSING SYSTEM

This is a continuation of application Ser. No. 50,503, filed June 29, 1970 now abandoned.

The present invention relates to a range determining device using the principle of triangulation in cooperation with a balanced member. Particularly, the invention relates to a range determining device usable to ascertain the distance from a viewing point to a subject, the device having a balanced member movable relative to a reference in the viewfinder of an optical instrument, the position of the balanced member varying in response to inclination of the viewfinder housing, and further defining a movable reference relative to which the image of the base of a remote subject is located for distance determination.

Range determining devices using the principle of triangulation for determining the distance between a camera and a subject are known. One class of these devices includes a gravity responsive mechanism having a pendulous member which swings relative to the optical axis of an objective. The influence of gravity orients the member to an aspect corresponding to focal distance as determined by the inclination of the axis, when the optical axis of the instrument is aimed at the base of a subject. To determine the location of the image in the viewfinder relative to the optical axis, it has been a practice to engrave or otherwise form a fixed reference substantially within the center of the viewfinder, which reference is a horizontally oriented line. The reference functions in the manner intended when being used for determining of the range at which the objective of the optical instrument is to be focused. However, the reference is fixed in the viewfinder and remains substantially in the center of the scene being viewed at all times. This type of reference becomes distracting to the user. Further, the multiple components of the system in addition to the previously required components of an optical instrument may add significantly to the cost of the instrument.

In accordance with the present invention, a rangefinding device using the principle of triangulation is provided. The device is adapted to be built into the viewfinder system of an optical instrument, such as a camera, at minimum added expense. In the viewfinder housing, bearings are mounted to support a beam member which member is counterbalanced on one side of the pivot axis defined by the bearings, wherein the indicating portion of the beam member will continue to seek a horizontal position independently of orientation of the viewfinder axis. Scale indicia relative to which the indicator member is movable are fixed on or in the normally transparent indicia supporting substrate defining a portion of the optical system of the viewfinder, or a cover plate therefore. In viewing a scene from the viewfinder, it is necessary only to align the image of the base of the subject on the moving reference, and to thereafter read the scale indicia relative to which the indicator portion of the beam is located. This distance information may then be transferred to the focusable objective of the instrument to focus that objective on the subject at that distance.

Further, the present invention includes a distance determining mechanism yielding a visible indication in the viewfinder of the distance between the camera and a subject. An indication of the condition of focus of the focusable objective is also conveyed to the viewfinder to enable the user to correlate the condition of the objective and the determined distance.

The geometry of the system uses as the hypotenuse of a right triangle a line of sight directed at the base of a remote subject when that base is aligned with a movable reference. Eyelevel of a standing adult of average height is used as the vertical dimension. Changes of the angle between the hypotenuse and the vertical upon viewing the base of the subject generates the additional information required to ascertain instrument-to-subject distance. The moving reference for subject base alignment is considered in locating the reference indicia in the viewfinder.

It is an object of the invention to provide a range determining device having the foregoing characteristics which will be efficient in use, durable, and which can be manufactured for a reasonable cost.

Further and other objects will be apparent from descriptions of the accompanying drawings in which like numerals refer to like parts.

In the drawings:

FIG. 1 is a perspective view of a camera and a viewfinder shown schematically, with parts broken away and parts omitted, and illustrating a preferred embodiment of the invention;

FIGS. 2a and 2b are schematic illustrations of the viewfinder as seen in a rangefinding procedure for distant and close subjects respectively; and FIG. 3 is a diagrammatic showing of a relative angular orientation of the camera, the optical axis, the balanced beam, and the viewfinder thereof.

Referring to the figures, an optical instrument is shown generally as a camera 10. The camera or other instrument includes a housing 12 supporting a focusable objective lens 14 and a viewfinder assembly 20 through which a remote subject S is viewed. The lens is mounted in an adjustable barrel assembly having an arrangement for indicating the condition of focus of the lens. Typically, the arrangement may be either formed externally on the adjustable lens barrel for visual reference or arranged to adjust a reference indicator visible internally of the viewfinder. The viewfinder assembly includes a housing 22 formed on or in the camera housing and further includes at least an image exit optical element 24 through which the operator views the subject, and other optical elements for focusing and erecting the image shown typically as optical element 26. The optical system of the viewfinder is selected to enable a viewer to distinguish elements of an image at any distance from infinity to a front plate 28 of the viewfinder. Such a front plate may be a focal plane within the viewfinder or camera housing if the viewfinder optics receive the image of the subject by way of the objective lens.

Within the housing 22 of viewfinder assembly 20 is mounted a distance determining or rangefinding mechanism generally indicated by reference numeral 30. The mechanism comprises bearings 32, such as axle receiving sockets, which bearings are fixed to opposed internal walls of housing 22 in substantial alignment one with the other. These bearings define horizontal axis 34 extending across the viewfinder housing in perpendicular relation to the viewfinder optical axis 36, and preferably in the plane of that axis.

A balanced beam indicator assembly of rangefinding mechanism 30 is supported within viewfinder housing 22 on bearings 32. The assembly comprises first and second elongated beam members 42 having, adjacent one end of both, bearing portion 44 shown as axles which cooperate with bearings 32 in the viewfinder housing. The free ends of the beam members are coupled together by an indicator 46, shown as a fine cross hair of a dimension adequate to be seen in the viewfinder. Attached to the ends of each of the beam members proximate bearing axles 44 are counterweight elements 48 which together are designed to have sufficient weight to exactly balance the leverage of beam member 42 and indicator cross hair 46. For reasons set forth hereinafter, the beams are supported and balanced so that the indicator is below the horizontal axis when optical axis 36 of the viewfinder is horizontal.

An indicia scale 50 is provided fixedly on or in the front plate 28 so as to be visible through the viewfinder. Tilting of the viewfinder or instrument housing causes relative movement between indicator 46 and scale 50 as the beam assembly remains relatively stable in space. Footage or meter indicia of scale 50 are correlated with distances to indicate accurately the instrument-to-subject distance when a line of sight 52, directed at the base of an image of a remote subject S, is aligned with indicator 46, as shown in FIGS. 2a, 2b, and 3.

For ease of setting of focus of focusable objective 14, a small mirror 58 is inserted at the bottom forward end of viewfinder assembly 20 and angled at the focus scale 18 of objective assembly 14 to enable the user to see that scale while continuing to view the scene through the viewfinder.

The structure of balanced beam indicator assembly 30 and viewfinder assembly 20 having been described, the operation of the range determining system becomes apparent. Since the beam assembly continuously seeks a balanced condition, inclination of the housing causes an apparent change in the position of indicator 46. This change of the location of the indicator relative to scale indicia 50 in the viewfinder causes the indicator to align with the proper indicia of the scale in response to inclination of viewfinder axis 36. At a close distance as represented in FIGS. 2b and 3a, the indicator and, thus, line of sight 52 directed at the base of the remote subject S, is high relative to viewfinder height. As the angle of inclination decreases and the instrument-to-subject distance increases, the indicator attains a correspondingly relatively lower position in the viewfinder until it acquires its lowest position when optical axis 36 is substantially horizontal as represented in FIG. 3 at position c.

The beam assembly is designed with the indicator below the pivot axis through bearings 32. That is, beams 42 are inclined downwardly from the axis at a small angle when in a balanced condition. Thus, if the viewfinder axis is horizontal as when viewing a subject at infinity, the indicator 46 is at the lowest position in the viewfinder. Since viewing of the subject when making a photograph is usually done with the camera and viewfinder substantially horizontal, and the indicator is at infinity or below the last specified distance adjacent the infinity indicia, the indicator is in an unobtrusive position which may be in substantial alignment with the bottom of the viewfinder frame or slightly below the bottom of the frame to a not-visible location.

The scale indicia fixed within the viewfinder are continually present but unobtrusive since they are displaced to one side of viewfinder.

It is to be understood that the embodiment shown illustrates the principle of operation, and changes and modifications can be made without departing from the spirit and scope of the invention.

What is claimed:

1. In combination in a camera including a viewfinder and focusable lens means defining an optical axis;
    means indicating the condition of said focusable lens means in said viewfinder; and
    distance determining means operable on the principle of triangulation supported for movement about an axis perpendicular to said optical axis for yielding a visible indication in the viewfinder of the distance between the camera and a subject as determined responsive to gravity, including indicator means arranged to be visible within the field of view of said viewfinder while determining distance and to be displaceable substantially from the field of view of said viewfinder when said camera is in a horizontal orientation.

2. The combination as in claim 1 wherein said indicator means defines a movable reference for visual alignment with the base of a subject.

3. The combination as in claim 2 wherein said distance determining means comprises a member movable about a pivot axis with said indicator means remote from said axis and oriented below said axis when said camera is in a horizontal orientation.

4. The combination as in claim 3 including indicia within said viewfinder indicating the distance to which said indicator means is adjusted when aligned with the base of a subject.

5. The combination as in claim 4 including distance representing means adjusted by said lens means and further including means transmitting the distance from said representing means into said viewfinder whereby the condition of said focusing lens means may be visually adjusted for focus corresponding to the distance indicated by said indicator means.

6. In combination in a camera having a housing supporting a viewfinder and a focusable objective lens defining an optical axis;
    distance determining means including balanced indicator means supported for movement about an axis perpendicular to said optical axis responsive to gravity, said indicator means being remote from and below said axis and being displaceable as a movable subject reference within the field of view of said viewfinder when said optical axis is inclined for viewing the base of a subject and being displaceable substantially from the field of view of said viewfinder when said camera is in a substantially horizontal orientation;
    indicia means arranged in the field of view of said viewfinder relative to which said indicator means is movable;
    a focus scale on said focusable objective lens for indicating the focus condition of said objective lens; and
    means between said viewfinder and said objective lens enabling visual comparison of said focus scale with the orientation of said indicator means,
    whereby the condition of said focusable objective lens may be visually adjusted for proper focus as determined by said indicator means.

* * * * *